(12) United States Patent
Marikawa et al.

(10) Patent No.: US 9,077,925 B2
(45) Date of Patent: Jul. 7, 2015

(54) IMAGE EDITION SERVICE SYSTEM AND SCREEN INFORMATION GENERATION METHOD

(75) Inventors: Yuichi Marikawa, Tokyo (JP); Shinji Murata, Hachioji (JP); Tomoaki Tamura, Hachioji (JP); Hideaki Haraga, Hachioji (JP); Tsuyoshi Narumiya, Okazaki (JP); Reiko Yamauchi, Tokyo (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 2279 days.

(21) Appl. No.: 10/550,790

(22) PCT Filed: Mar. 24, 2004

(86) PCT No.: PCT/JP2004/004063
§ 371 (c)(1),
(2), (4) Date: Sep. 27, 2005

(87) PCT Pub. No.: WO2004/088971
PCT Pub. Date: Oct. 14, 2004

(65) Prior Publication Data
US 2006/0224460 A1 Oct. 5, 2006

(30) Foreign Application Priority Data
Mar. 31, 2003 (JP) .................................. 2003-093941

(51) Int. Cl.
G06Q 30/00 (2012.01)
H04N 1/387 (2006.01)
G06Q 30/06 (2012.01)

(52) U.S. Cl.
CPC ........... *H04N 1/387* (2013.01); *G06Q 30/0601* (2013.01)

(58) Field of Classification Search
CPC .......................... H04N 1/387; G06Q 30/0601
USPC .............. 705/26, 27, 26.1, 26.2, 26.25, 26.3, 705/26.35, 26.4, 26.41–26.44, 26.5, 705/26.61–26.64, 26.7, 26.8, 26.81, 26.82, 705/26.9, 27.1, 27.2; 382/162; 345/629
See application file for complete search history.

(56) References Cited

U.S. PATENT DOCUMENTS 4,751,507 A * 6/1988 Hama et al. ................... 715/784
6,226,017 B1 * 5/2001 Goossen et al. .............. 345/531

(Continued)

FOREIGN PATENT DOCUMENTS

| JP | 2-268369 | 11/1990 |
|----|----------|---------|
| JP | 2001-339559 | 12/2001 |
| JP | 2003-16285 | 1/2003 |

OTHER PUBLICATIONS

William A. Barrett and Alan S. Cheney, "Object-Based Image Editing", © 2002 ACM 1-58113-521-1/02/0007.*

*Primary Examiner* — Naeem Haq
(74) *Attorney, Agent, or Firm* — Cozen O'Connor

(57) ABSTRACT

An image-editing service system comprises a server, a user terminal, an administrator terminal, a worker terminal, and the server including a database for storing the image information sent from worker terminal, a first image generating section for generating a first image based on the image information stored in the database, a display section for displaying an image display frame so as to display the first image in a display window of the user terminal and displaying a window information so as to display a display condition of the first image which is allowed to be input, a second image generating section for generating a second image regard to the first image based on the display condition inputted by the user terminal and, a window information generating section for displaying the first image and the second image simultaneously.

17 Claims, 12 Drawing Sheets

(56) References Cited

U.S. PATENT DOCUMENTS

| | | | |
|---|---|---|---|
| 6,344,853 B1 * | 2/2002 | Knight | 345/629 |
| 6,853,461 B1 * | 2/2005 | Shiimori | 358/1.15 |
| 6,980,962 B1 * | 12/2005 | Arganbright et al. | 705/14.31 |
| 7,050,070 B2 * | 5/2006 | Ida et al. | 345/629 |
| 7,180,618 B2 * | 2/2007 | Ueda et al. | 358/1.15 |
| 2002/0067500 A1 * | 6/2002 | Yokomizo et al. | 358/1.15 |
| 2010/0118052 A1 * | 5/2010 | Tsue et al. | 345/629 |
| 2012/0086726 A1 * | 4/2012 | Matsumoto | 345/629 |
| 2013/0222313 A1 * | 8/2013 | Nakamura et al. | 345/173 |

* cited by examiner

FIG. 5

| No. | DESIGN ORDER No. | ENTRY DATE AND TIME | CUSTOMER | SELECTED DESIGN | MATERIAL (IMAGE MATERIAL) | MATERIAL (CHARACTER MATERIAL) | QUOTED PRICE | FINISH DATE | DESIGN REQUESTED DATE | DESIGNER | EDIT IMAGE FILE | EDIT TIME | CUSTOMER REQUEST | DESIGNER REQUEST | ADMINISTRATOR INSTRUCTION | CHARACTER | PICTURE | TONE |
|---|---|---|---|---|---|---|---|---|---|---|---|---|---|---|---|---|---|---|
| 1 | 001 | 2002/11/1/10:03 | C-001 | HA-002 | 001-1 001-2 001-3 A-8 C-2 | 001-T1 001-T2 A-T3 | ¥3,000 | 2002/11/8 | 2002/11/1 | D-111 | 001-HA-002-1 | 3:15.33 | | | | OK | OK | OK |
| ... | ... | ... | | | | | | | | | | | | | | | | |
| 11 | 011 | 2002/11/8/15:34 | C-01A | HW-021 | 011-1 011-2 011-3 A-8 C-2 | 011-T1 011-T2 A-T1 | ¥3,000 | 2002/11/15 | 2002/11/8 | D-111 | 001-HW-021-1 | | | | | OK | | |
| 12 | 012 | 2002/11/8/17:01 | C-BBB | TA-045 | 012-1 012-2 D-2 | 012-T1 A-T2 | ¥1,800 | 2002/11/15 | | | | | | | | | | |
| 13 | ... | ... | | | | | | | | | | | | | | | | |
| ... | ... | ... | | | | | | | | | | | | | | | | |

23a

▼ CLICK

▶ CLICK

▲ CLICK

IMAGE EDITION SERVICE SYSTEM AND SCREEN INFORMATION GENERATION METHOD

RELATED APPLICATION

This is a U.S. National Phase Application under 35 USC 371 of International Application PCT/JP2004/004063, filed on 24 Mar. 2004.

TECHNICAL FIELD

The present invention relates to an image-editing service system that provides a service for creating a design such as, for example, a postcard with a picture image attached thereto for a customer via a network such as the Internet and a window information generation method applied in the image-editing service system.

BACKGROUND

In recent years, customers increasingly use postcards with picture images attached thereto for the greeting of marriage or the greeting of the New Year or other purposes. Also, business cards with photos are often used. There is proposed a network business that handles the creation order of these postcards and business cards with picture images attached thereto via the Internet and other networks (for example, see Patent Document 1).

In this case, a customer, for example, selects a predetermined layout or determines the layout such as a position of a specific picture image and a position of text information. The customer inputs as the text information, for example, an address, a name, a greeting text and other information. The picture image may be a single sheet or several sheets synthesized together, and the customer sends the picture image(s) and orders a design thereof. Further, the customer may order corrections such as deletion of unnecessary background from the picture image(s) and removal of red-eye.

On the basis of such a design order from the customer, in an output center and other places carrying out the image print service, an administrator places an order of the design creation work to a worker such as a designer, and upon completion of the design creation work, the administrator makes the customer confirm that the created design does not differ from the design the customer ordered, and then prints out and sends the final product to the customer.

In the network business described in Patent Document 1, the customer can cause the image created by the design work to be displayed in a terminal owned by the customer via the Internet with a browser software to confirm that the created design does not differ from the design order.

(Patent Document 1)
Japanese Patent Publication Laid-Open No. 2002-149793 (pages 1 through 8, FIGS. 1 through 10)

However, correction leakage may occur particularly in small characters (for example, E-mail addresses and the like) that are difficult to confirm depending on the display window of the terminal owned by the customer. Further, the customer has been able to print out an image created by the design work using a printer or other devices owned by the customer by downloading the image data of the image to be displayed in the terminal owned by the customer. Because the output center or other places is originally operated for the purpose of the profit capable of being earned by printing out images, the profit is reduced or lost if the customer prints out as described above, and thereby the profit as business is reduced by half.

To prevent the customer from downloading the image as it is created by the design work, for example, there are a method of displaying an image with characters such as "Sample" superimposed thereon to be displayed in a terminal owned by the customer and a method of causing the image to be displayed at low resolution, and with the former method, the customer cannot surely confirm the design because the image created by the design work is partially hidden, and with the latter, the customer may not judge that the design is good or bad because the impression of the displayed image is altered.

SUMMARY

The present invention is made in light of the above circumstances, and is to provide an image-editing service system allowing a customer to surely confirm the design by varying an image to be displayed in a terminal in the customer side in accordance with conditions and is capable of preventing the customer from obtaining the image as it is created by the design work when downloading and printing out the image, and a window information generation method thereof.

(1) In order to achieve the above object, the present invention is characterized by an image-editing service system comprising: a network; a server coupled to the network; a user terminal coupled to the network for carrying out a design order; an administrator terminal coupled to the network for receiving the order via the server and placing an order of the image-editing work based on the design order; and a worker terminal coupled to the network for carrying out image-editing based on the order placement to create image information, wherein the server comprises a database for storing the image information sent from the worker terminal; and window information generating section generating window information which is allowed to be displayed in a display window of the user terminal, the window information comprising an image display frame for displaying a first image based on the stored image information and displaying display condition of the first image which is allowed to be input, and the window information generating section displaying the first image with a second image partially superimposed thereon.

(2) Further, the present invention is characterized by an image-editing service system comprising: a network; a server coupled to the network; a user terminal coupled to the network for carrying out a design order; an administrator terminal coupled to the network for receiving the order via the server and placing an order of the image-editing work based on the design order; and a worker terminal coupled to the network for carrying out image-editing based on the order placement to create image information, wherein the server comprises a database for storing the image information sent from the worker terminal; and window information generating section generating window information which is allowed to be displayed in a display window of the user terminal, the window information comprising an image display frame for displaying a first image based on the stored image information and displaying the selection allowed to be input either the whole display or the partial display, the window information generating section displaying the first image with a second image partially superimposed thereon when the whole display is selected by the user terminal, while displaying a portion of the first image when the partial display is selected by the user terminal.

(3) Further, the present invention is characterized in that, in the image-editing service system described in (2), the window information generating section further comprises a softkey for changing the display portion of the first image when the partial display is selected by the user terminal, updating the window information in response to an input using the soft-key by the user terminal, then changing and displaying the display portion of the first image.

(4) Further, the present invention is characterized by an image-editing service system comprising: a network; a server coupled to the network; a user terminal coupled to the network for carrying out a design order; an administrator terminal coupled to the network for receiving the order via the server and placing an order of the image-editing work based on the design order; and a worker terminal coupled to the network for carrying out image-editing based on the order placement to create image information, wherein the server comprises a database for storing the image information sent from the worker terminal; and window information generating section generating window information which is allowed to be displayed in a display window of the user terminal, the window information comprising an image display frame allowed to be displayed for displaying a first image based on the stored image information and displaying the selection allowed to be input either the whole display or the partial display and with the combination of the number of pixels composing the first image, and the window information generating section displaying the first image with a second image partially superimposed thereon when the whole display is selected by the user terminal and the number of pixels composing the first image is equal to or larger than a predetermined number of pixels, displaying the first image when the whole display is selected and the number of pixels composing the first image is smaller than the predetermined number of pixels, and displaying a portion of the first image when the partial display is selected.

(5) Further, the present invention is characterized in that, in the image-editing service system described in (4), the predetermined number of pixels is a number of pixels at which an image with a predetermined resolution or higher can be obtained when a user prints the image to the desired size.

(6) Further, the present invention is characterized in that, in the image-editing service system described in (4) and (5), the window information generating section further comprises a soft-key for changing the display portion of the first image when the partial display is selected by the user terminal, updating the window information in response to an input using the soft-key by the user terminal, then changing and displaying the display portion of the first image.

(7) Further, the present invention is characterized in that, in the image-editing service system described in any of (1) through (6), the window information generating section further displays a plurality of display states of the second image which is allowed to be selected in the window information, displaying the image with the second image superimposed thereon based on the display state selected.

(8) Further, the present invention is characterized by an image-editing service system comprising: a network; a server coupled to the network; a user terminal coupled to the network for carrying out a design order; an administrator terminal coupled to the network for receiving the order via the server and placing an order of the image-editing work based on the design order; and a worker terminal coupled to the network for carrying out image-editing based on the order placement to create image information, wherein the server comprises a database for storing the image information sent from the worker terminal; and window information generating section generating window information which is allowed to be displayed in a display window of the user terminal, the window information comprising an image display frame for displaying a first image based on the stored image information and displaying the selection allowed to be input either the whole display or the partial display, and the window information generating section displaying the first image composed of the number of pixels smaller than a predetermined number of pixels when the whole display is selected by the user terminal, while displaying a portion of the first image composed of the number of pixels equal to or larger than the predetermined number of pixels when the partial display is selected.

(9) Further, the present invention is characterized in that, in the image-editing service system described in (8), the predetermined number of pixels is a number of pixels at which a user can obtain an image with a predetermined resolution or higher when the user prints the image to the desired size.

(10) Further, the present invention is characterized in that, in the image-editing service system described in (8) and (9), the window information generating section further comprises a soft-key for changing the display portion of the first image when the partial display is selected by the user terminal, updating the window information in response to an input using the soft-key by the user terminal, then changing and displaying the display portion of the first image.

(11) Further, the present invention is characterized by a window information generation method which is carried out in an image-editing service system comprising: a network; a server coupled to the network; a user terminal coupled to the network for carrying out a design order; an administrator terminal coupled to the network for receiving the order via the server and placing an order of the image-editing work based on the design order; and a worker terminal coupled to the network for carrying out image-editing based on the order placement to create image information, the window information generation method comprising: a step of storing the image information sent from the worker terminal; a step of generating window information which is allowed to be displayed in a display window of the user terminal, the window information comprising an image display frame for displaying a first image based on the stored image information and displaying display condition of the first image which are allowed to be input; and a step of displaying the first image with a second image partially superimposed thereon based on the input display condition.

(12) Further, the present invention is characterized by window information generation method which is carried out in an image-editing service system comprising: a network; a server coupled to the network; a user terminal coupled to the network for carrying out a design order; an administrator terminal coupled to the network for receiving the order via the server and placing an order of the image-editing work based on the design order; and a worker terminal coupled to the network for carrying out image-editing based on the order placement to create image information, the window information generation method comprising: a step of storing the image information sent from the worker terminal; a step of generating window information which is allowed to be displayed in a display terminal of the user terminal, the window information comprising an image display frame for displaying a first image based on the stored image information and displaying the selection allowed to be input either the whole display or partial display of the first image; a step of selecting and inputting either the whole display or the partial display; and a step of displaying the first image composed of a number of pixels smaller than a predetermined number of pixels when the whole display is selected while displaying a portion of the first image composed of a number of pixels equal to or larger than the predetermined number of pixels when the partial display is selected.

BRIEF DESCRIPTION OF THE DRAWINGS

FIG. 5 is a view showing the structure of an order entry placement control table 23a provided in a database of the server;

DESCRIPTION OF THE PREFERRED EMBODIMENT

Hereinafter, an embodiment as an example of an image-editing service system according to the present invention and a window information generation method used in the image-editing service system will be described in detail with reference to the drawings.

The image-editing service system is to provide a service for a customer in which, for example, the customer first orders a design in which an image material the customer owns and an image material previously prepared or a character material such as a text the customer desires and a character material such as a fixed text previously prepared are arranged in a predetermined layout or a layout the customer orders to an output center, an administrator in the output center receives the order and places a design order to a designer, the designer carries out image-editing based on the customer order, and then the finished product is printed out in the output center or at an outside shop or other places to provide the customer. Further, the present invention enables the customer, when the customer makes correction of the edit image the designer created through image-editing by using a display window of the user terminal, to surely confirm particularly even small characters in the edit image and displays a window in which the customer cannot download the edit image as it is created as described above in the customer terminal. Hereinafter, the image-editing service system will be described in detail with reference to the drawings.

First Embodiment

Figure 1:
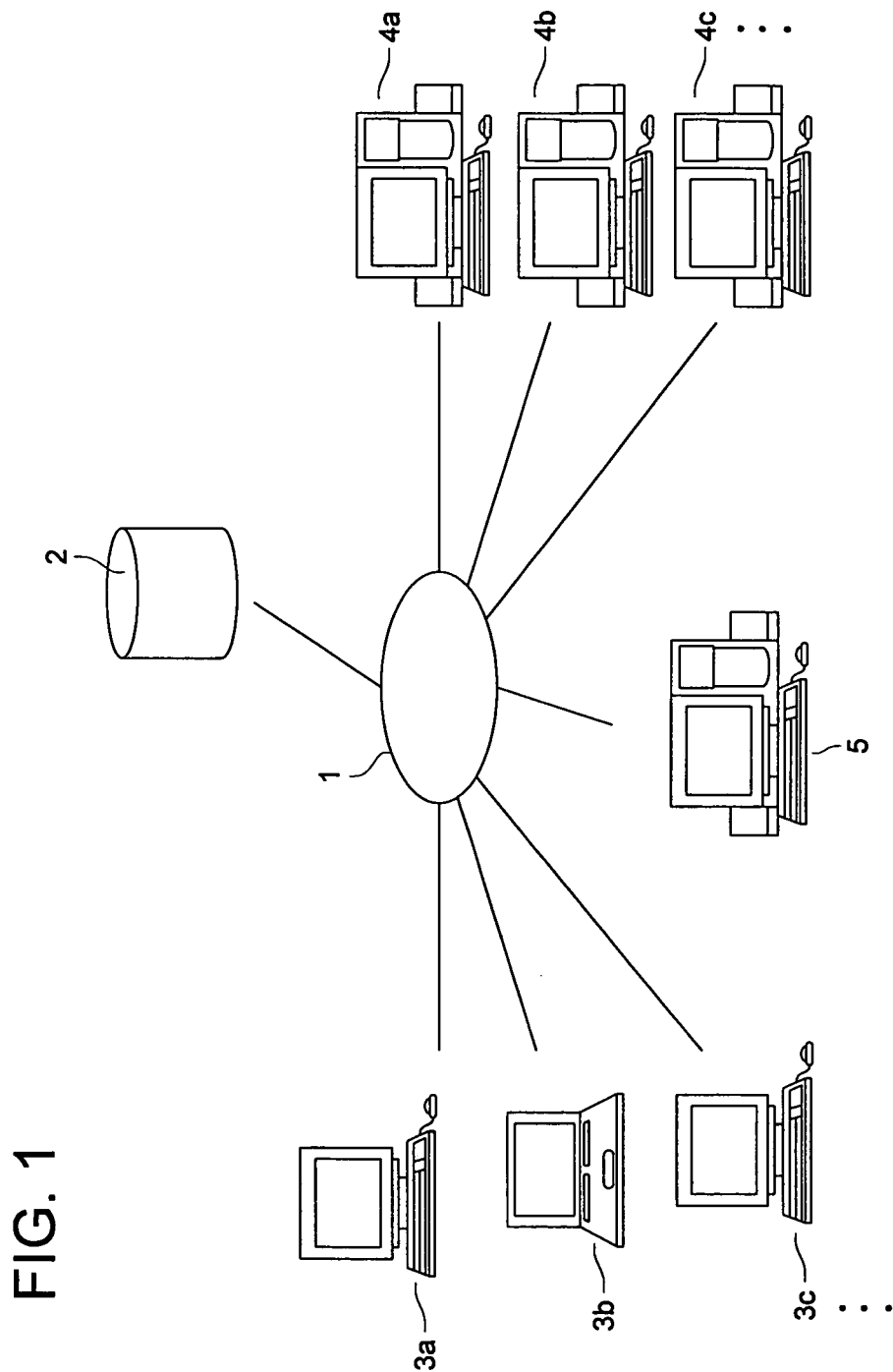
FIG. 1 is a configuration view showing an embodiment of an image-editing service system according to the present invention.

At first, the general configuration of an entire image forming system of a first embodiment according to the present invention is described with reference to FIG. 1. FIG. 1 is a configuration view of the image-editing service system.

As shown in FIG. 1, the image-editing service system comprises a server 2, a plurality of user terminals 3a, 3b, 3c, a plurality of worker terminals 4a, 4b, 4c, and an administrator terminal 5 that are coupled to a network 1 respectively.

The network 1 interconnects a computer system, terminals, and data communication equipments to each other, which may be the fixed line connection such as a dedicated line, a pubic line, or the wireless connection via a communication satellite. The so-called Internet and the like are included herein.

The user terminal 3 is a terminal the customer uses for orders and the like in order to receive the image-editing service, which is the so-called electric terminal capable of transmitting and receiving character information and image information to and from personal computers, Personal Digital Assistants, cellular phones and other devices. The user terminal 3 comprises a display window such as a monitor, operating sections such as a keyboard and a mouse, having at least a browser function for browsing Web pages, displaying a window based on the window information provided from the server 2, and enabling the customer to carry out an operation to receive the image-editing service such as a deign order using the window. The user terminal 3 further comprises a mail delivery function.

In order to supply an image material and other materials from the user terminal 3 via the network 1, when the user terminal 3 is a personal computer or a Personal Digital Assistant, it is preferably able to capture the image by coupling to an image input device such as, for example, a digital camera or a scanner and being set up with a recording medium in which an image is recorded. Further, when the user terminal 3 is a cellular phone, it is preferably able to capture the image by providing with a digital camera or able to capture the image by receiving the image data through communication from another electronic device.

The administrator terminal 5 is a terminal an administrator uses for receiving a design order from a customer and controlling the image-editing service such as an order placement of the design work based on the original order, which is the so-called personal computer or workstation or the like. The administrator terminal 5 comprises a display window such as a monitor and operating sections such as a keyboard and a mouse, having at least a browser function for browsing Web pages, displaying a window based on the image information provided from the server 2, enabling the administrator to carry out the control operations for receiving the design order and providing the image-editing service such as an order placement of the design work based on the original order using the window. The administrator terminal further comprises a mail delivery function. The administrator terminal 5 is placed in an output center, being coupled to an image forming apparatus for printing out the design with image-editing completed, and the printout is delivered to the customer.

The worker terminal 4 is a terminal a designer uses for doing the design work, which is the so-called personal computer or workstation or other devices. The worker terminal 4 comprises a display window such as a monitor and operating sections such as a keyboard and a mouse, having at least a browser function for browsing Web pages, and capable of displaying a window based on the image information provided from the server 2. The worker terminal 4 further comprises a mail delivery function.

Figure 2:
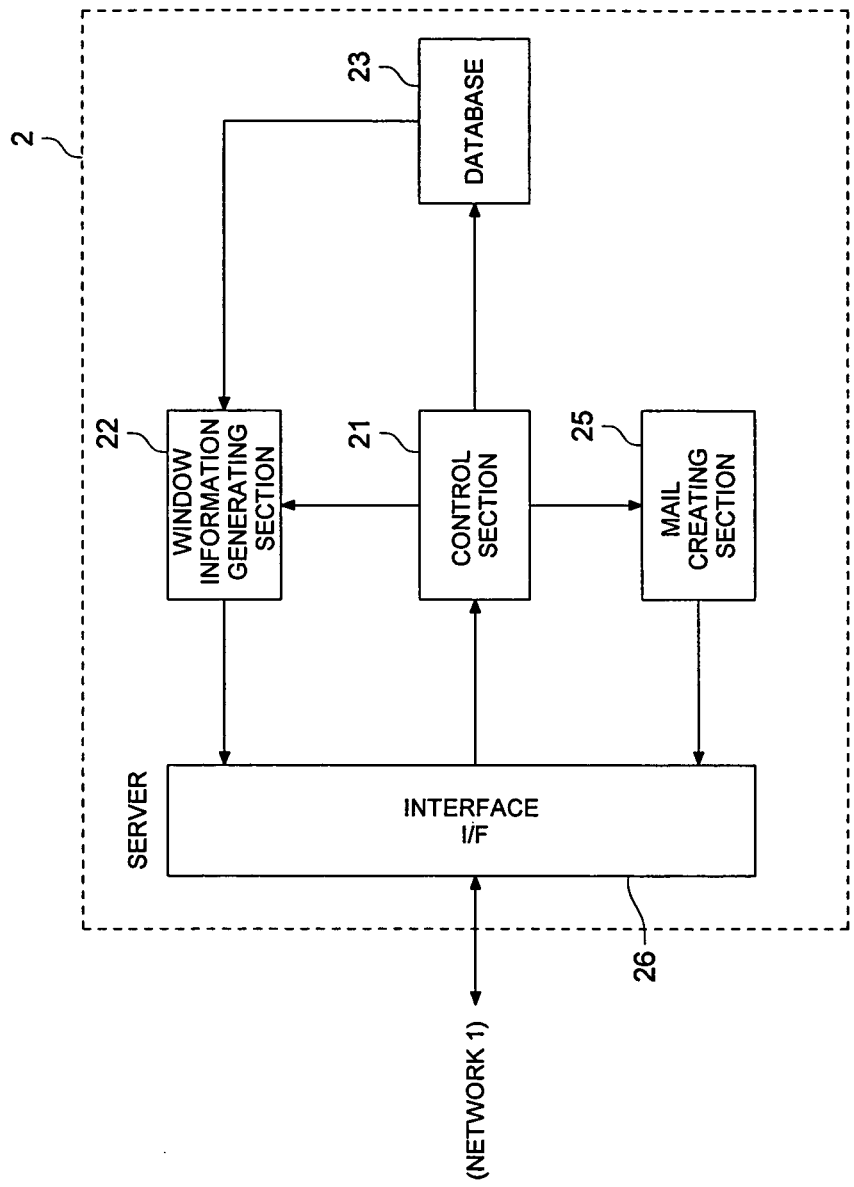
FIG. 2 is a functional block diagram showing the configuration of server controls of the image-editing service system.

The server 2, which is a control device and its functional block diagram is shown in FIG. 2, comprises control section 21, window information generating section 22, a database 23, mail creating section 25, and an interface I/F 26 with the network 1.

The control section 21 receives various types of information and requests sent via the network 1, rewriting data of the database 23 and updating a registration of new data and the like.

The window information generating section 22 comprises, when a request is sent from the above terminals 3, 4, and 5, a function of generating window information allowed to be displayed using a browser soft in the terminals 3, 4, 5 respectively in response to the request or generating window information for updating the window already displayed; and a function of sending the window information to a terminal which is the source of the request via the interface I/F 26.

The database 23 comprises: information about orders; information about design order placements; an order entry placement control table 23*a* (described in detail below) for storing various types of image information and other information; a customer table for storing information about customers; and a designer table for storing information about designers.

The mail creating section 25 comprises a function of creating and sending a mail to notify the terminals 3, 4, 5 about a state depending on the progress from the information on the design order placement the control section 21 receives and the information on the design work.

Figure 3:
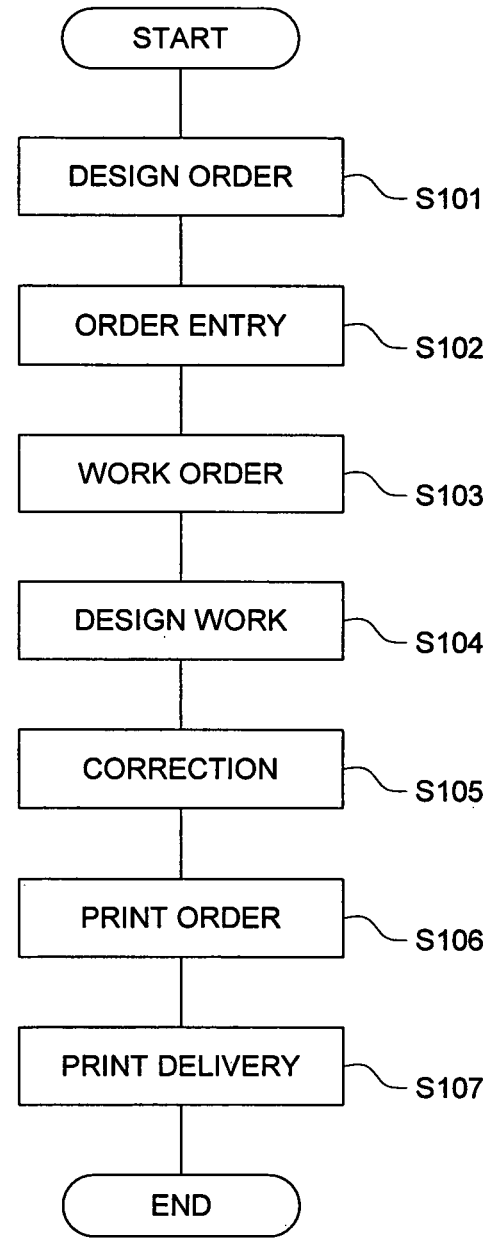
FIG. 3 is a flowchart showing the process of an image-editing service carried out in the image-editing service system.
Figure 4:
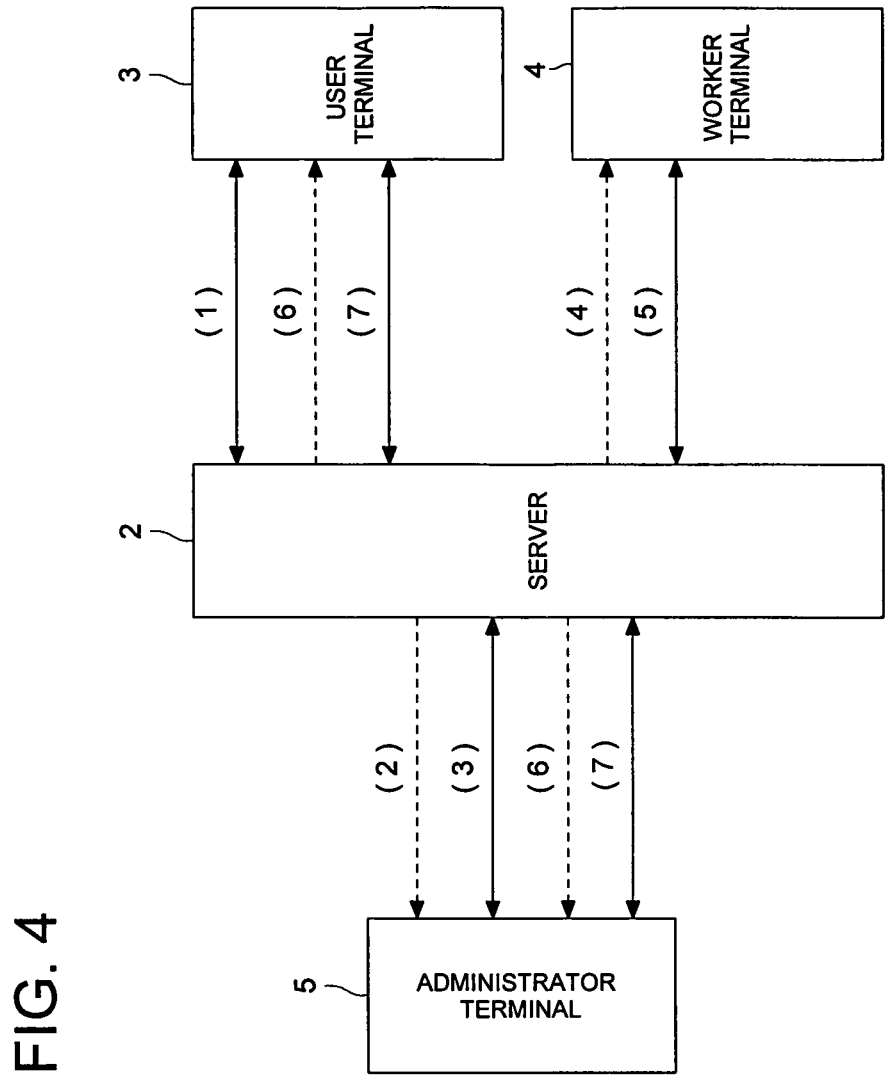
FIG. 4 is an illustrative view for illustrating the flow of processes and communications between the server and respective terminals composing the image-editing service system.

Next, an example of the procedure of the image-editing service carried out in the image-editing service system will be described. FIG. 3 is a flowchart showing the process of the image-editing service, and FIG. 4 is an illustrative view for illustrating the flow of the processings and communications between the server 2 and each of the terminals 3, 4, 5.

The design order is first carried out (Step S101 in FIG. 3, hereinafter omitted and referred to as S101). The design order is carried out between the user terminal 3 and the server 2 as shown in FIG. 4(1). The customer starts up the browser using the user terminal 3 to access the server 2. Upon reception of this access in the control section 21, the server 2 first generates and sends window information of a window including a button allowing a given authenticator the customer previously acquired for customer authentication to be input and for sending the authenticator to the server 2 (a soft-key on the screen. Hereinafter the soft-key is referred to as a button) through the window information generating section 22. The customer inputs the given authenticator in the user terminal 3 and sends it to the server 2. The server 2, which receives this operation in the control section 21, generates and sends the window information of a window (not shown) including a menu which is made selectable and the like through the window information generating section 22. The window is displayed in the user terminal 3 in which the customer selects a desired menu, and the server 2, which receives the selection in the control section 21, generates and sends the window information through the window information generating section 22 based on the selection, and then the window is updated in the user terminal 3. By repeating the menu selection and window update as described above, the customer causes the window for the order to be displayed and carries out an order. Hereinafter, the description about the authentication and the window update will be omitted therefrom as much as possible because the display of the window for the work and inputs in each of the terminals 3, 4, 5 uses a given authenticator the designer acquired for the worker terminal 4 and a given authenticator the administrator acquired for the administrator terminal, wherein the transaction similar to the transaction of the given authenticator the customer acquired is carried out between each of the terminals and the server 2, and the window information depending on a request from each of the terminals 3, 4, 5, is generated and sent through the window information generating section 22, and then the window is similarly updated.

Now return to the description of the order. For example, the design order is carried out as follows: the customer selects a design layout from a design selection window (not shown) for selecting a design layout, selecting from the fixed texts previously prepared as the character materials or writing original comments with a comment selection window (not shown) for writing and selecting character materials, selecting from the images such as characters and landscapes previously prepared as the image materials or selecting from the images previously retrieved in the user terminal with an image selection window (not shown) for selecting image materials, and then uploading to the server 2 and carrying out other related operations.

Next, the server 2 receives the order (S102). The control section 21 which receives the above order stores various types of information in the order entry placement control table 23*a*. For example, the order entry placement control table 23*a* has the configuration as shown in FIG. 5, and taking an example of No. 11, the followings would be stored therein: "011" is for example written in "Design Order No.", the entry date and time "2002/11/8 15:34" in "Entry Date and Time", the code indicating the customer who ordered "C-01A" in "Customer", for example "HW-021" indicating the selected design layout in "Selected Design", for example "011-1, 011-2, 011-3, A-8, C-2" as the image material file of the selected and uploaded image materials in "Material (Image Material)", and the text file of the character materials selected and written "011-T1, 011-T2, A-T1" in "Material (Character Material)". In addition, stored in "Quoted Price" and "Finish Date" and "Customer Request" are requests and other related information from the customer done upon the order placement. As described above, after the order is received in the control section 21 and stored in the order entry placement control table 23*a*, the mail creating section 25 creates a mail with the content of the order entry and sends the mail to the administrator terminal 5 as shown in FIG. 4(2).

Next, in the administrator terminal 5, the administrator who received this mail sorts the work on the received design to a designer and places the design order (S103). The design order is carried out between the administrator terminal 5 and the server 2 as shown in FIG. 4(3). The administrator implements the authentication by the given authenticator and the update of the window in the administrator terminal 5, selecting a designer and the like with an order window (not shown) for the design order, and then placing the design order.

When the design order is made, the control section 21 of the server 2 which receives the design order stores a code indicating the ordered designer in "Designer" of the order entry placement control table 23*a* shown in FIG. 5 as "D-111" for example in No. 11, and "2002/11/8" as the design requested date in "Design Requested Date" for example in No. 11. Instructions from the administrator to the designer made upon the order placement are stored in "Administrator Instruction". As described above, after the design order is received in the control section 21 and stored in the order entry placement control table 23a, the mail creating section 25 creates a mail with the content of the design order placement and sends the mail to the worker terminal 4 for the selected designer as shown in FIG. 4(4).

Upon reception of the mail, the designer carries out the design work using the worker terminal 4 (S104). The design work is carried out between the worker terminal 4 and the server 2 as shown in FIG. 4(5). The designer implements the authentication by the given authenticator and the update of the window in the worker terminal 4 to display the design window (hot shown) for carrying out the design work. For example, the designer downloads the image materials and character materials using the design work window, and carries out image-editing such as cutting-out of an image, waste disposal and color correction using an image-editing software previously installed in the worker terminal 4. Further, for example, the designer may provide image-editing function in the design work window so as to carry out image-editing in the design work window. As described above, the designer creates an edit image and sends the image information of the edit image to the server 2.

The server 2 receives the image information of the edit image in the control section 21 and stores the image information in "Edit Image File" of the order entry placement control table 23a. For example in No. 11, it is stored as the image file "011-HW-021-1" in which "-1" indicating the history is suffixed. Further, requests and other information from the designer made upon the transmission of the image information are stored in "Designer Request".

The mail creating section 25 creates a mail with the content of the completion of the design work and sends the mail to the administrator terminal 5 and the user terminal 3 as shown in FIG. 4(6).

Upon reception of the mail, the customer and the administrator make correction on the edit image (S105). The correction is carried out between the user terminal 3 and the server 2 and between the administrator terminal 5 and the server 2 as shown in FIG. 4(7).

Upon reception of the mail, the administrator implements the authentication by the given authenticator and the update of the window in the administrator terminal 5, displaying the edit image in the display window of the administrator terminal 5 based on the image file "011-HW-021-1" as the window information stored in the order entry placement control table 23a as described above, and correcting spelling mistakes and the image and the like by visually confirming the edit image the designer created whether it is equivalent to the design the customer desires.

While, the customer implements the authentication by the given authenticator and the update of the window in the user terminal 3, displaying the edit image in the display window of the user terminal 3 based on the image file "011-HW-021-021-1" as the image information stored in the order entry placement control table 23a as described above, and correcting spelling mistakes and the image and the like by visually confirming the edit image the designer created whether it is equivalent to the design the customer desires.

Figure 6:
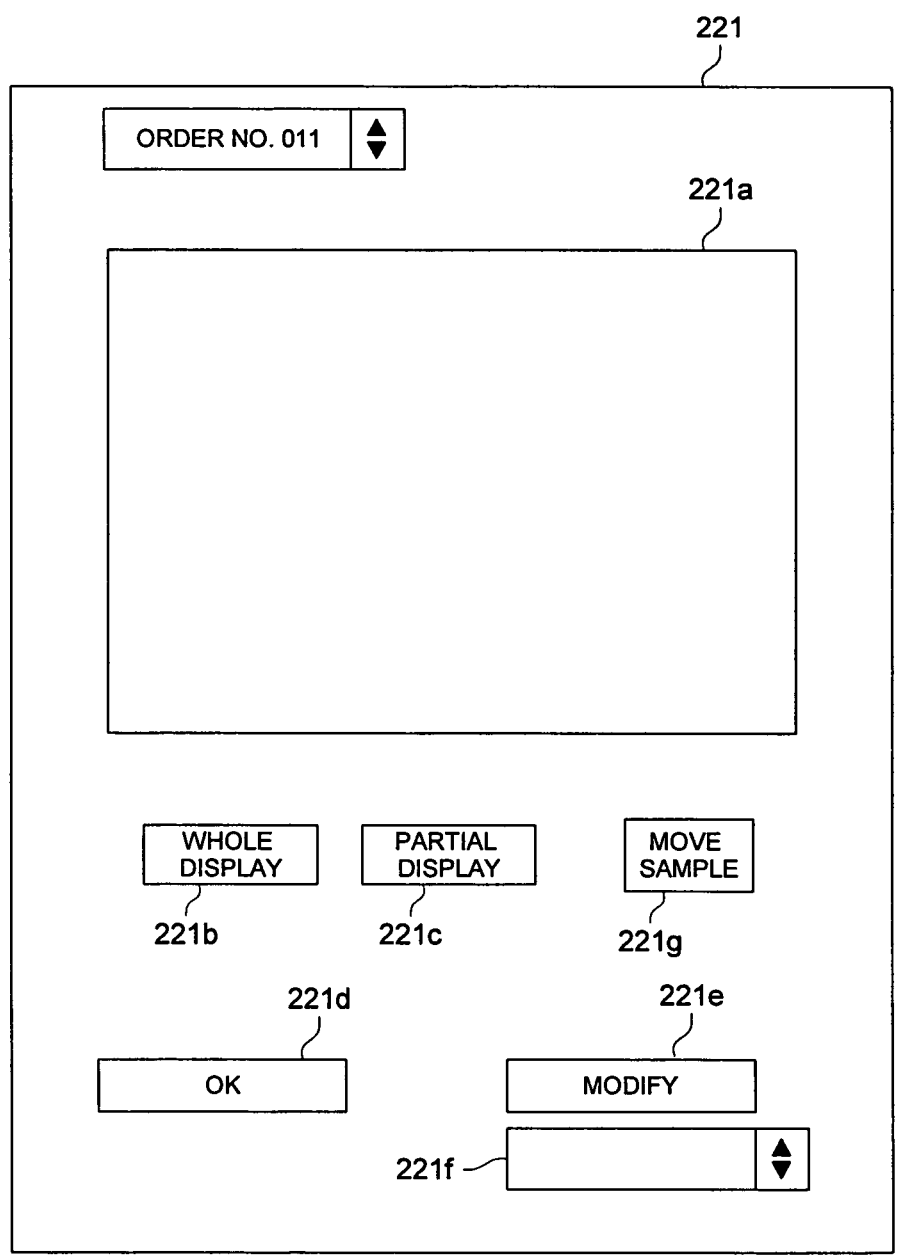
FIG. 6 is a view showing an example of the window involving the correction of an edit image which is displayed in a customer terminal of the image-editing service system shown in FIG. 1.
Figure 7:
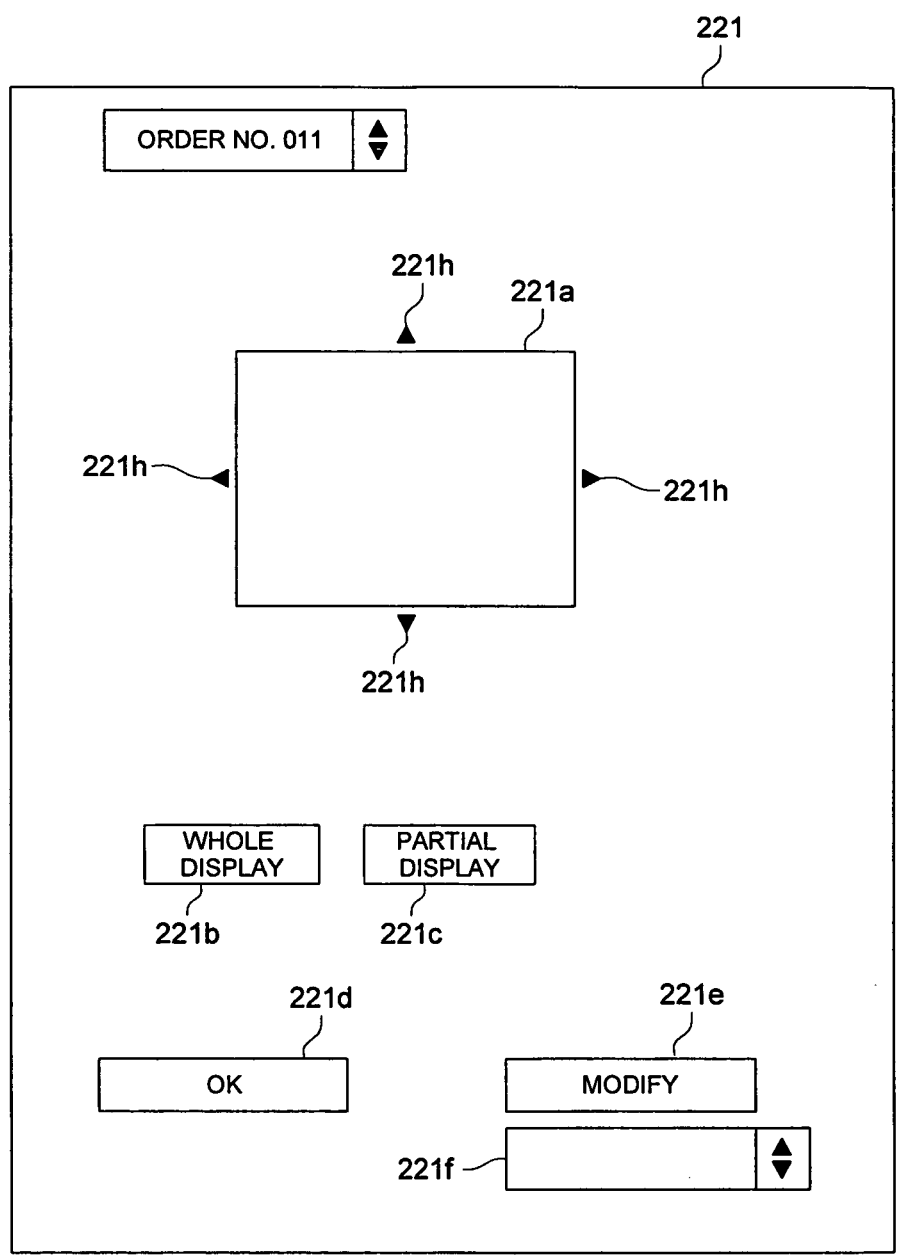
FIG. 7 is a view showing an example of the window involving the correction of the edit image which is displayed in the customer terminal of the image-editing service system shown in FIG. 1.

Herein, a correction window 221 displayed in the user' terminal 3 in the above correction will be described in detail with reference to the figures. FIG. 6 and FIG. 7 are examples of the correction window 221 displayed in the user terminal 3, and FIG. 6 shows the case of displaying the whole edit image, FIG. 7 shows the case of displaying a portion of the edit image.

The correction window 221 comprises an edit image display frame 221a as the image display frame of the present invention; a whole display button 221b and a partial display button 221c for selecting the whole display and the partial display as the display condition of the edit image to be displayed in the edit image display frame 221a; an OK button 221d for sending the content that the correction result is OK; a modify button 221e for sending the content that modification exists; and a text input field 221f in which the customer writes the modification contents, and when the whole display of the edit image is selected, the correction window 221 further comprising a move button 221g described below as shown in FIG. 6, and when the partial display of the edit image is selected, the correction window 221 further comprising image scroll buttons 221h (four buttons) described below as shown in FIG. 7.

Figure 8:
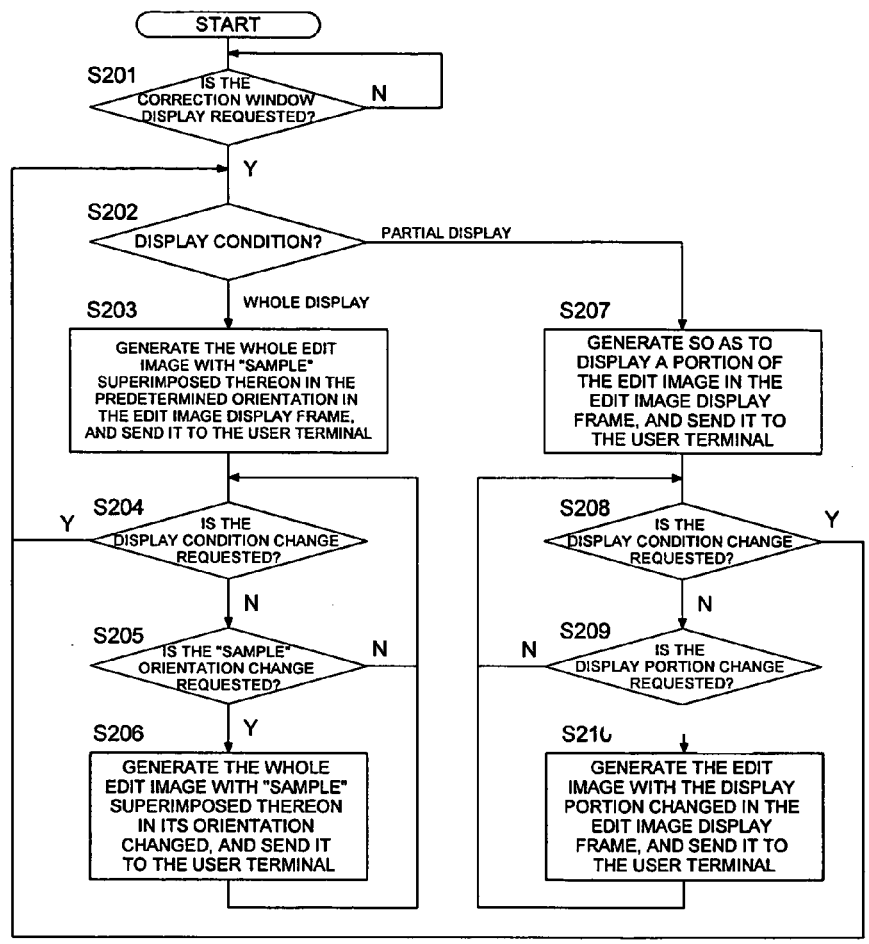
FIG. 8 is a flowchart showing an example of the process of a window information generation method which is carried out in the image-editing service system.

Next, the display of the edit image of the edit image display frame 221a will be described using FIG. 8. FIG. 8 is a flowchart showing the procedure for generating the correction window 221 in the server 2.

Figure 9:
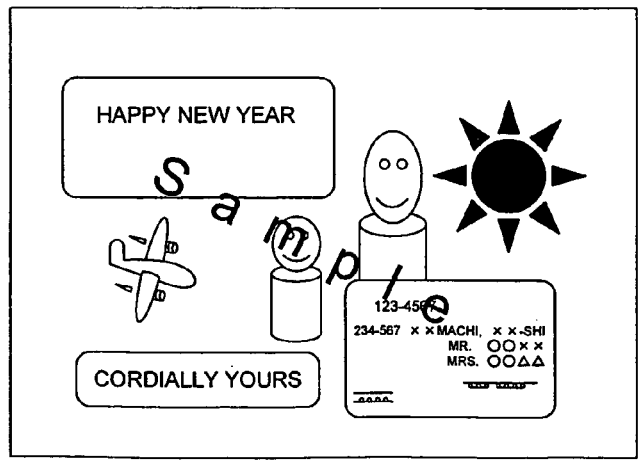
FIG. 9 is a view showing an example of the image displayed in the window shown in FIG. 6.

At first, the customer implements the authentication by the given authenticator and the update of the window in the user terminal 3 to operate so as to display the correction window 221, the control section 21 of the server 2 receives this operation, and in response to the display request (S201), the window information generating section 22 starts generating the correction window 221. The display condition for initially displaying the correction window is set by a predetermined condition. In the present embodiment, although it is assumed that the whole display is the display condition for the initial display, the partial display may be set to the display condition for displaying the correction window. The window information generating section 22 generates the correction window 221 so as to display the whole edit image with "Sample" superimposed thereon in a given orientation (in the present example, the upward-sloping is assumed to be the given orientation, but not limited to this.) in the edit image display frame 221a of the correction window 221 and sends it to the user terminal 3 (S203). In the display window of the user terminal 3, "Sample" is displayed on the edit image in the upward-sloping orientation as shown in FIG. 9. A second image of the present invention is this "Sample" which is partially overlapped onto the edit image. However, "Sample" is only an example, and any display such as, for example, "Mihon (sample)", "This is a sample" or a character may be used herein. Further, this second image may include the one which is colored so as to hide the edit image as the first image which is the overlapped portion, the one which is white outlined, or the one which is made translucent through which the edit image can be seen. By displaying the edit image as described above, the customer can confirm whole of the edit image, while when the customer downloads and prints out the edit image, the display of "Sample" is attached to the printout. Therefore, the customer must order the printout using the edit image to the output center and other places, so that the profit as the business of the image-editing service is not impaired.

Figure 10:
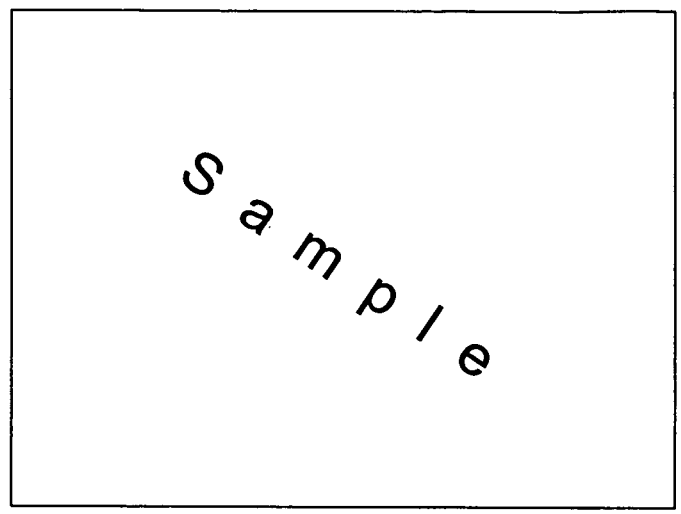
FIGS. 10a and 10b are views each showing an example of the image displayed in the window in FIG. 6.
Figure 10:
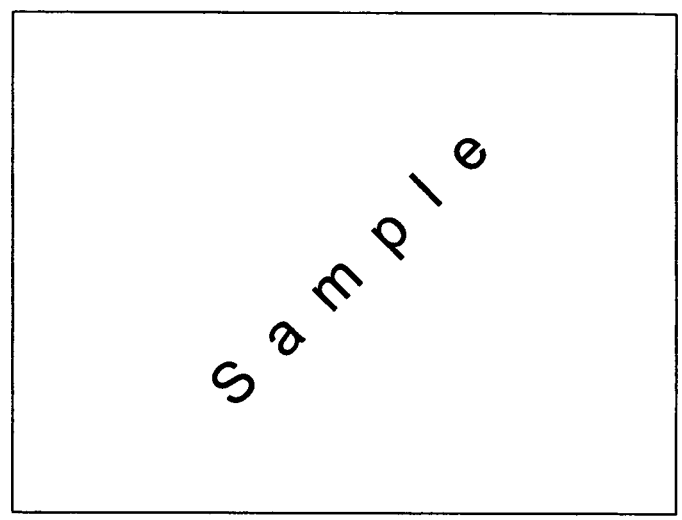

Further, when wanting to confirm the portion on which "Sample" is superimposed during the confirmation of the whole edit image, the customer clicks the move button 221g. The control section 21 receives this operation, and in response to the display request (S205), the window information generating section 22 generates the correction window 221 so as to display the whole edit image with "Sample" superimposed thereon in the orientation thereof changed and sends it to the user terminal 3 (S206). For one example, the display state is changed to the downward-sloping "Sample" as shown in FIG. 10a or changed to the upward-sloping "Sample" as shown in FIG. 10b. Incidentally, the display state change is not limited to the example of FIG. 10a and FIG. 10b, and may include the translation in the vertical direction and the change in various sizes or the change in the display content itself. Because the display state of the second image which is displayed superimposed as described is changed, a portion the customer cannot confirm is not generated.

Figure 11:
FIGS. 11a through 11d are views each showing an example of the image which is displayed in the window shown in FIG. 7.
Figure 11:
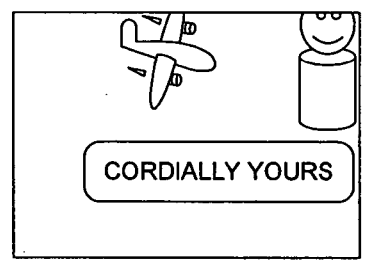
Figure 11:
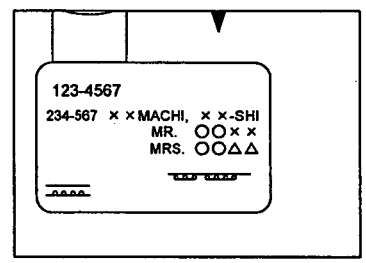
Figure 11:
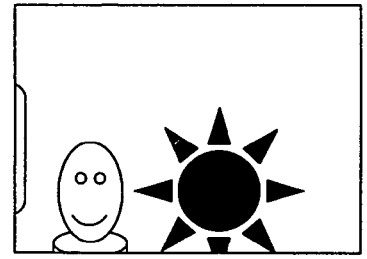

Further, when the customer clicks the partial display button 221c so as to change the display condition to the partial display, the control section 21 receives this operation, and in response to the request of display condition change (S204), the window information generating section 22 sets the display condition to the partial display (S202) and generates the correction window sodas to display a predetermined portion of the edit image in the edit image display frame 221a, and sends it to the user terminal 3 (S207). The present embodiment describes that upper-left portion of the edit image is first displayed, but not limited to this, and any other portion such as lower-left portion may be displayed. In the display window of the user terminal 3, the upper-left portion is displayed as shown in FIG. 11a. Further, FIG. 11a through FIG. 11b show that the edit image display frame 221a displays the one-quarter of the edit image, but not limited to this, and any other size such as the half or the one-eighth or an arbitrary size without displaying the whole may be displayed. Further, when the customer clicks the window scroll button 221h of the desired direction, the control section 21 receives this operation, and in response to the request of the display portion change (S209), the window information generating section 22 generates the correction window so as to display the edit image with the display portion changed in the edit image display frame 221a, and sends it to the user terminal (S210). In the display window of the user terminal 3, for example, the edit image with the display portion changed is displayed as shown in FIG. 11a through FIG. 11d.

There is no display of "Sample" in this display, so that the edit image can easily be confirmed. Further, if the edit image display frame 221 is designed to be expandable on the displayed window, the small characters and the like can easily be confirmed. However, the customer can obtain only a portion of the edit image when downloading and printing out the edit image. Therefore, the customer must order the printout using the edit image to the output center or other places, so that the profit as the business of the present image-editing service is not impaired.

Further, when the customer clicks the whole display button 221b so as to change the display condition to the whole display, the control section 21 receives this operation, and in response to the request of the display condition change (S208), the window information generating section 22 can change the display condition to the whole display by carrying out the processes S202 and S203.

After having made the correction as described above and confirmed that there is no problem in the edit image, the customer clicks the OK button 221d, and the control section 21 of the server 2 received this operation and then the correction is completed. When any modification exists, the customer writes the modification content in the text input field 221f and clicks the modify button 221e, and the control section 21 of the server 2 receives this operation. Subsequently, the operations of the edit image modification by the designer and the correction by the administrator and the customer are repeated.

When the correction is completed, the print order (S106) and the print delivery (S107) are placed and then the present print service is completed.

Further, the above description was made assuming that the administrator terminal 5 of the image-editing service system is one, but a plurality of administrator terminals may be provided herein.

Second Embodiment

Next, a second embodiment according to the present invention will be described. It is to be noted that detailed description of the practically similar structures to those in the first embodiment is omitted therefrom, and the description will be made mainly on the different points.

The feature of the embodiment is the combination of the number of pixels of the edit image as the first image to be displayed in the customer terminal 3 in addition to the whole display or the partial display of the first embodiment.

Hereinafter, the present embodiment will be described taking an example of the case in which the edit image is printed out to the size equivalent to the second class ordinary postcard (referred to as a postcard hereinafter).

The window information generating section 22 has, in addition to the function described in the first embodiment, a function of generating window information so as to cause the image based on the image information stored in the order entry placement control table 23a to be displayed at the number of pixels composing a plurality of images when the image is displayed in the terminals 3, 4, 5.

The image file of "Edit Image File" in the order entry placement control table 23a is created and stored at so-called 4-base (1536 dots×1024 dots) which is the number of pixels at which the resolution (dot per inch) offering an adequate picture quality can be obtained when the image is printed out in the postcard size. However, this is for the description of the present embodiment made with taking an example of the case in which the printout to the postcard size is intended, but not limited to this. For example, the image file is stored so that the adequate resolution can be obtained in the printout, for example, at the number of pixels smaller than 4-base when the object to be printed out is smaller than the postcard, while at the number of pixels larger than 4-base when the object to be printed out is larger than the postcard.

Figure 12:
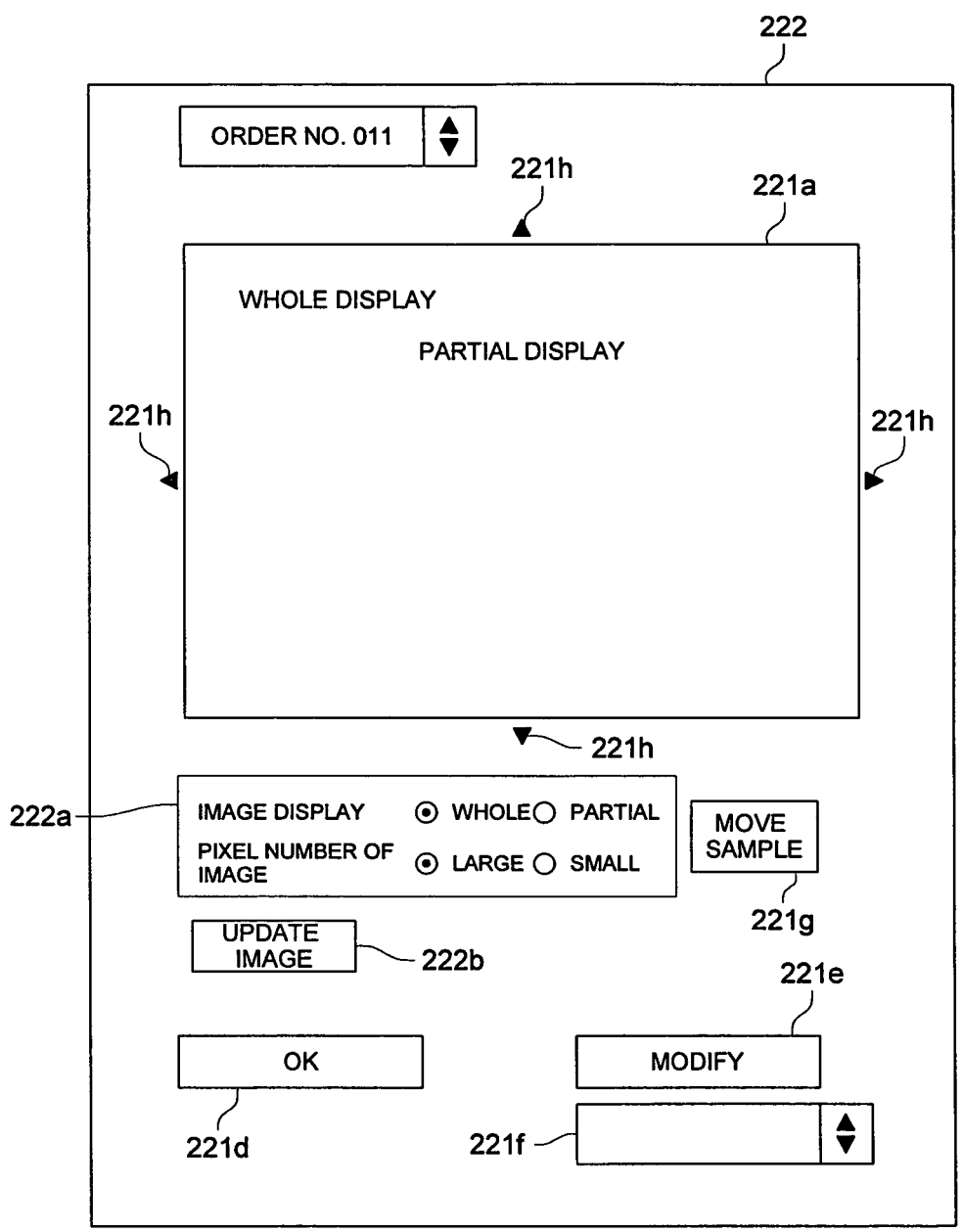
FIG. 12 is a view showing an example of the window involving the correction of an edit image which is displayed in a customer terminal of the image-editing service system shown in FIG. 1.

FIG. 12 shows a correction window 222, and the present embodiment is equipped with a display condition specification field 222a and a window update button 222b in place of the whole display button 221b and the partial display button 221c of the correction window 221 used in the first embodiment. The display condition specification field 222a comprises: "Image Display" for the selection of the whole display or the partial display with "Whole" and "Partial" selectably provided therein; and "Pixel Number of Image" for the selection of the number of pixels composing the edit image with "Large" and "Small" selectably provided therein, and in the present embodiment, the number of pixels composing the edit image is assumed to be 4-base for "Large", and the number of pixels is assumed to be 1-base (768 dots×512 dots) for "Small". The 1-base is the number of pixels offering an adequate picture quality when the edit image display field 221a displays in the display window. Further, the edit image display field 221a may be varied in its size depending on the number of pixels to be displayed or may be fixed size. The move button 221g is designed to be displayed when "Sample" is displayed, the scroll buttons 221h are designed to be displayed when the edit image is partially displayed.

Figure 13:
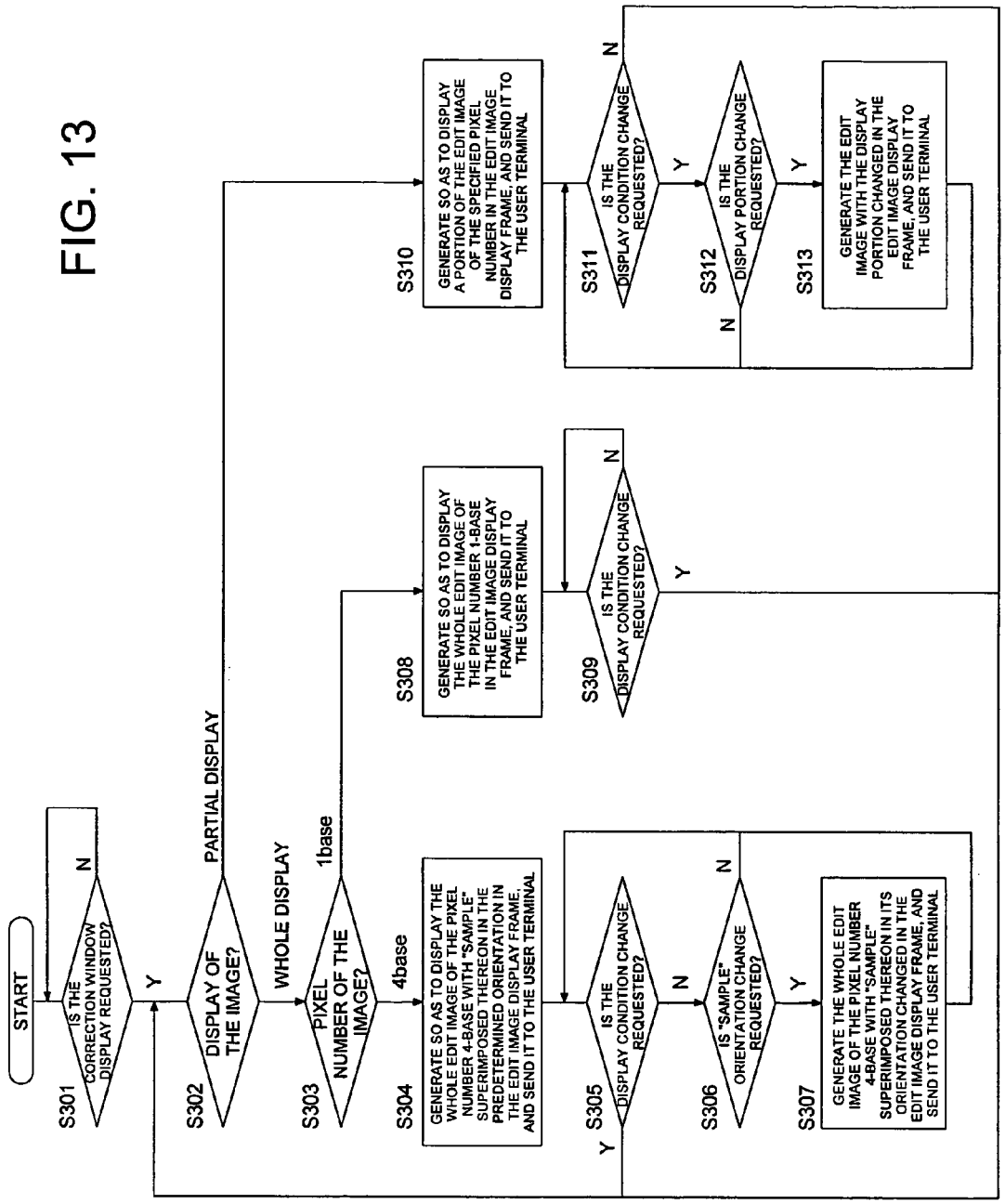
FIG. 13 is a flowchart showing an example of the process of the window information generation method which is carried out in the image-editing service system.

Next, the display of the edit image in the edit image display frame 221a will be described using FIG. 13. FIG. 13 is a flowchart showing the procedure for generating the correction window 222 in the server 2.

At first, the customer implements the authentication by the given authenticator and the update of the window in the user terminal 3 to operate so as to display the correction window 221, the control section 21 of the server 2 receives this operation, and in response to the display request (S301), the window information generating section 22 starts generating the correction window 221. The display condition for the initial display is set by predetermined condition (S302, S303). In the present embodiment, the description is made assuming that the whole display with 4-base for the number of pixels composing the edit image is the display condition for the initial display, but the partial display may be set as the display condition for displaying the correction window. The window information generating section 22 generates the correction window 221 so as to display the whole edit image comprising the number of pixels of 4-base with "Sample" superimposed thereon in the given orientation (in the embodiment, the upward-sloping is set as the given orientation, but not limited to this.) in the edit image display frame 221a of the correction window 222, and sends it to the user terminal 3 (S304). In the display window of the user terminal 3, the downward-sloping "Sample" is displayed on the edit image as shown in FIG. 9. "Sample" can be changed in its orientation similar to the first embodiment (S306, S307).

Next, the customer selects "Whole Display" for the image display and "Small" for the number of pixels of the image in the display condition specification field 222a so as to change to the whole display of the edit image composed of the number of pixels of 1-base and clicks the image update button 222b, the control section 21 receives this operation, and in response to the request of the display condition change (S305), the window information generating section 22 sets the display condition to the whole display (S302) with 1-base (S303) to generate the correction window 222 so as to display the whole edit image composed of the number of pixels of 1-base in the edit image display frame 221a, and sends it to the user terminal (S306).

With the 1-base edit image displayed as described above, the customer can grasp the whole impression, and with the 4-base edit image which has a large number of pixels the edit image is composed of, the customer can confirm particularly small characters with enlarging and displaying the whole image. Further, the 1-base edit image does not have an adequate resolution when printed out, so that the preferable picture quality cannot be obtained when the edit image is downloaded and printed out on the postcard and the like, and when the 4-base edit image is downloaded and printed out, the display of "Sample" is attached to the printout.

Further, when the customer selects "Partial Display" for the image display and, for example, "Large" for the number of pixels of the image in the display condition specification field 222a so as to change the display condition to the partial display and clicks the window update button 222b, the control section 21 receives this operation, and in response to the request of the display condition change (S309), the window information generating section 22 sets the display condition to the partial display (S302) with 4-base (S303) to generate the correction window so as to display a predetermined portion of the edit image with the number of pixels of 4-base in the edit image display frame 221a, and sends it to the user terminal (S310). It is needless to say that when the "Small" number of pixels is selected, the window information generating section 22 generates the correction window so as to display a predetermined portion of the edit image with the number of pixels of 1-base. Further, when the customer clicks the image scroll button 221h of the desired orientation, the window information generating section 22 generates the correction window 222 (S312, S313) similar to the first embodiment, and the same contents as described in the first embodiment are displayed in the display window of the user terminal 3. In this case, the one-quarter of the 4-base image, namely the 1-base image is displayed in the 1-base edit image display frame 221 in which the picture quality is preferred, so that small characters and the like can easily be confirmed.

In addition, by selecting desired display condition in the display condition specification field 222a so as to change the display condition and clicking the window update button 222b, the customer can change the display of the edit image.

The case of intending to print out to the postcard size was described above assuming that the predetermined number of pixels of the present invention is 4-base, but this is an example and not to be limited to this. Further, the predetermined number of pixels varies depending on the desired size to be printed out. In other words, the predetermined number of pixels is referred to the number of pixels at which the resolution offering an adequate picture quality can be obtained in the printout.

Further, the above description was made assuming that the combination of the selection between the whole display and the partial display with the number of pixels composing the edit image is selected, or it may be designed to carry out the selection of the whole display and the partial display in the correction window 222, and when the whole display is selected, the window information generating section 22 generates the window as S308 through S309 of FIG. 13, and when the partial display is selected, the window information generating section 22 generates the window so as to display a portion of the 4-base edit image in S310 of FIG. 13 and carries out the operations as S311 through S313, so that the customer grasps the whole impression from the 1-base edit image which is displayed whole and easily confirms small characters and the like by displaying a portion of the 4-base edit image.

As described above, the present invention enables the provision of an image-editing service system in which, by varying the image to be displayed in a terminal of the customer side in accordance with conditions, the customer can surely confirm the design while cannot obtain the image as it is created by the design work when downloading and printing out the image, and a window information generation method thereof.

Consequently, the customer must order the printout using the edit image to the output center and other places, so that the business profit of the present image-editing service will be increased.

What is claimed is:

1. An image-editing service system comprising:
   a network;
   a server connecting to the network;
   a user terminal for performing a design order connecting to the network;
   an administrator terminal connecting to the network for receiving the design order via the server and performing an order of image-editing work based on the design order;
   a worker terminal connecting to the network for performing image-editing based on the order of image-editing work and for creating an image information; and,
   the server comprising:

a database for storing the image information sent from the worker terminal;

a first image generating section for generating a first image based on the image information stored in the database;

a display section for displaying an image display frame so as to display the first image in a display window of the user terminal and displaying a window information so as to display a display condition of the first image which is allowed to be input;

a second image generating section for generating a second image with regard to the first image based on the display condition input by the user terminal;

a window information generating section for displaying the first image and the second image simultaneously; and a mail creating section configured to create and send mail to notify the user, administrator and worker terminals about a state depending on progress from information on the design order received by a control section and depending on information based on the design order; and the image-editing service system further comprising:

a display section for displaying the first image can select either a whole display or a partial display and displaying a number of pixels composing the first image can be selected on the display window of the user terminal;

wherein the window information generating section generates a correction window for a) displaying the first image and the second image simultaneously when the whole display is selected by the user terminal and the number of pixels composing the first image is equal to or larger than a predetermined number of pixels, b) displaying the first image when the whole display is selected and the number of pixels composing the first image is smaller than the predetermined number of pixels, and c) displaying a portion of the first image when the partial display is selected.

2. The image-editing service system of claim 1, further comprising:

a display section for displaying the first image can select either a whole display or a partial display on the display window of the user terminal;

wherein the window information generating section for displaying the first image and the second image simultaneously when the whole display is selected by the user terminal, while displaying a portion of the first image when the partial display is selected by the user terminal.

3. The image-editing service system of claim 2, wherein the window information generating section comprising a soft-key for changing the display portion of the first image when partial display is selected by the user terminal, updating the window information in response to an input using the soft-key by the user terminal, and changing and displaying the display portion of the first image.

4. The image-editing service system of claim 1, wherein the predetermined number of pixels is the number of pixels set up according to the size of the print media which a user demands.

5. The image-editing service system of claim 1, wherein the window information generating section comprising a soft-key for changing the display portion of the first image when partial display is selected by the user terminal, updating the window information in response to an input using the soft-key by the user terminal, and changing and displaying the display portion of the first image.

6. The image-editing service system of claim 1, wherein the window information generating section for generating a plurality of the second image with regard to the first image, displaying the plurality of the second image can be selected, and displaying the first image and the selected second image simultaneously.

7. An image-editing service system comprising:

a network;

a server connecting to the network;

a user terminal for performing a design order connecting to the network;

an administrator terminal connecting to the network for receiving the design order via the server and performing an order of image-editing work based on the design order;

a worker terminal connecting to the network for performing image-editing based on the order of image-editing work and for creating an image information; and, the server comprising:

a database for storing the image information sent from the worker terminal;

a first image generating section for generating a first image based on the image information stored in the database;

a display section for displaying an image display frame so as to display the first image in a display window of the user terminal and displaying a window information so as to display a display condition of the first image which is allowed to be input;

a second image generating section for generating a second image with regard to the first image based on the display condition input by the user terminal;

a window information generating section for displaying the first image and the second image simultaneously; and a mail creating section configured to create and send mail to notify the user, administrator and worker terminals about a state depending on progress from information on the design order received by a control section and depending on information based on the design order; and the image-editing service system further comprising:

a display section for displaying the first image can select either a whole display or a partial display on the display window of the user terminal;

wherein the window information generating section generates a correction window for displaying the first image composed of the number of pixels smaller than a predetermined number of pixels when the whole display is selected by the user terminal, while displaying a portion of the first image composed of the number of pixels equal to or larger than the predetermined number of pixels when the partial display is selected.

8. The image-editing service system of claim 7, wherein the predetermined number of pixels is the number of pixels set up according to the size of the print media which a user demands.

9. The image-editing service system of claim 7, wherein the window information generating section comprising a soft-key for changing the display portion of the first image when partial display is selected by the user terminal, updating the window information in response to an input using the soft-key by the user terminal, and changing and displaying the display portion of the first image.

10. A window information generating method using an image-editing service system including a network, a server connecting to the network, a user terminal for performing a design order connecting to the network, an administrator terminal connecting to the network for receiving the design order via the server and performing an order of image-editing work based on the design order, and a worker terminal connecting to the network for performing image-editing based on the order of image-editing work and for creating an image information, comprising the steps of:

storing the image information sent from the worker terminal;

generating a first image based on the image information stored;

displaying for an image display frame so as to display the first image in a display window of the user terminal and displaying a window information so as to display a display condition of the first image which is allowed to be input;

inputting the display condition;

generating a second image to the first image based on the display condition input by the user terminal;

displaying the first image and the second image simultaneously;

creating and sending mail to notify the user, administrator and worker terminals about a state depending on progress from information on a received design order and depending on information based on the design order;

displaying the first image can select either a whole display or a partial display on the display window of the user terminal;

selecting and inputting either the whole display or the partial display; and generating a correction window for displaying the first image composed of the number of pixels smaller than a predetermined number of pixels when the whole display is selected, while displaying a portion of the first image composed of the number of pixels equal to or larger than the predetermined number of pixels when the partial display is selected.

11. An image-editing service system comprising:
a network;
a server connecting to the network;
a user terminal for performing a design order connecting to the network;
an administrator terminal connecting to the network for receiving the design order via the server and performing an order of image-editing work based on the design order;
a worker terminal connecting to the network for performing image-editing based on the order of image-editing work and for creating an image information; and
the server comprising:
a database for storing the image information sent from the worker terminal;
a first image generating section for generating a first image based on the image information stored in the database;
a display section for displaying an image display frame so as to display the first image in a display window of the user terminal and displaying a window information so as to display a display condition of the first image which is allowed to be input;
a second image generating section for generating a second image with regard to the first image based on the display condition input by the user terminal; and
a window information generating section for displaying the first image and the second image simultaneously;
wherein the display section for displaying the first image is configured to select one of a whole display and a partial display and displays a number of pixels composing the first image which is selectable on the display window of the user terminal; and wherein the window information generating section generates a correction window for a) displaying the first image and the second image simultaneously when the whole display is selected by the user terminal and the number of pixels composing the first image is equal to or larger than a predetermined number of pixels, b) displaying the first image when the whole display is selected and the number of pixels composing the first image is smaller than the predetermined number of pixels, and c) displaying a portion of the first image when the partial display is selected.

12. The image-editing service system of claim 11, wherein the predetermined number of pixels is the number of pixels set up according to the size of the print media which a user demands.

13. The image-editing service system of claim 11, wherein the window information generating section comprising a soft-key for changing the display portion of the first image when partial display is selected by the user terminal, updating the window information in response to an input using the soft-key by the user terminal, and changing and displaying the display portion of the first image.

14. An image-editing service system comprising:
a network;
a server connecting to the network;
a user terminal for performing a design order connecting to the network;
an administrator terminal connecting to the network for receiving the design order via the server and performing an order of image-editing work based on the design order;
a worker terminal connecting to the network for performing image-editing based on the order of image-editing work and for creating an image information; and,
the server comprising:
a database for storing the image information sent from the worker terminal;
a first image generating section for generating a first image based on the image information stored in the database; and
a display section for displaying an image display frame so as to display the first image in a display window of the user terminal and displaying a window information so as to display a display condition of the first image which is allowed to be input;
wherein the display section is configured to select one of a whole display and a partial display on the display window of the user terminal to display the first image; and
wherein the window information generating section generates a correction window for displaying the first image composed of the number of pixels smaller than a predetermined number of pixels when the whole display is selected by the user terminal, while displaying a portion of the first image composed of the number of pixels equal to or larger than the predetermined number of pixels when the partial display is selected.

15. The image-editing service system of claim 14, wherein the predetermined number of pixels is the number of pixels set up according to the size of the print media which a user demands.

16. The image-editing service system of claim 14, wherein the window information generating section comprising a soft-key for changing the display portion of the first image when partial display is selected by the user terminal, updating the window information in response to an input using the soft-key by the user terminal, and changing and displaying the display portion of the first image.

17. A window information generating method using an image-editing service system including a network, a server connecting to the network, a user terminal for performing a design order connecting to the network, an administrator terminal connecting to the network for receiving the design order via the server and performing an order of image-editing work based on the design order, and a worker terminal connecting to the network for performing image-editing based on the order of image-editing work and for creating an image information, comprising the steps of:

- storing the image information sent from the worker terminal;
- generating a first image based on the image information stored;
- displaying for an image display frame so as to display the first image in a display window of the user terminal and displaying a window information so as to display a display condition of the first image which is allowed to be input;
- inputting the display condition;
- displaying the first image can select either a whole display or a partial display on the display window of the user terminal;
- selecting and inputting either the whole display or the partial display; and
- generating a correction window for displaying the first image composed of the number of pixels smaller than a predetermined number of pixels when the whole display is selected, while displaying a portion of the first image composed of the number of pixels equal to or larger than the predetermined number of pixels when the partial display is selected.

* * * * *